A. BATCHELAR.
Improvement in Kilns.

No. 114,095.                                   Patented April 25, 1871.

Witnesses:
W. H. Beck.
G. F. Warren.

Inventor:
Arthur Batchelar

A. BATCHELAR.
Improvement in Kilns.
No. 114,095. Patented April 25, 1871.
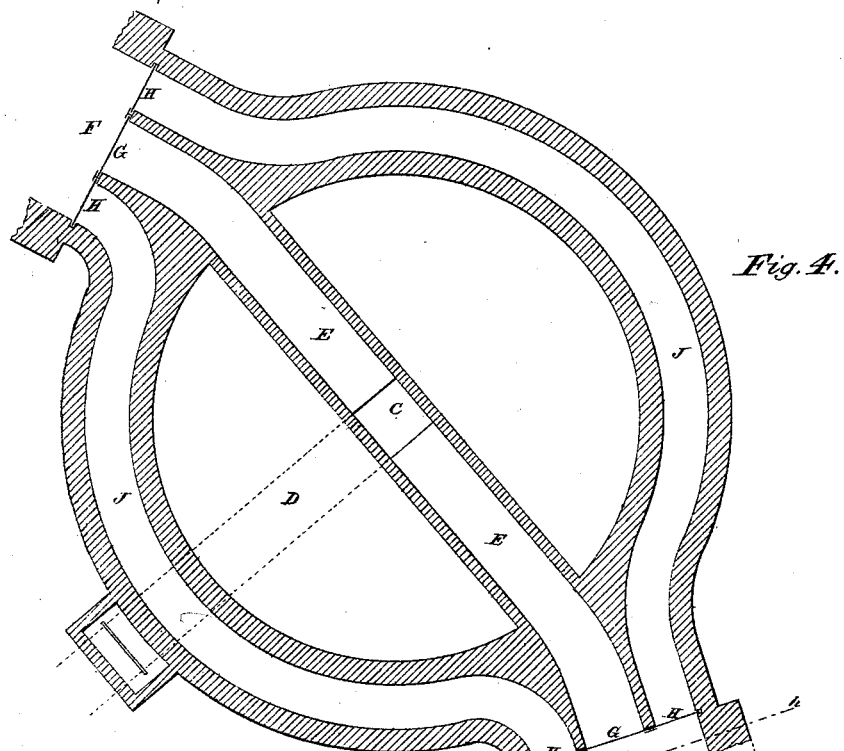
Fig. 4.
Fig. 5.
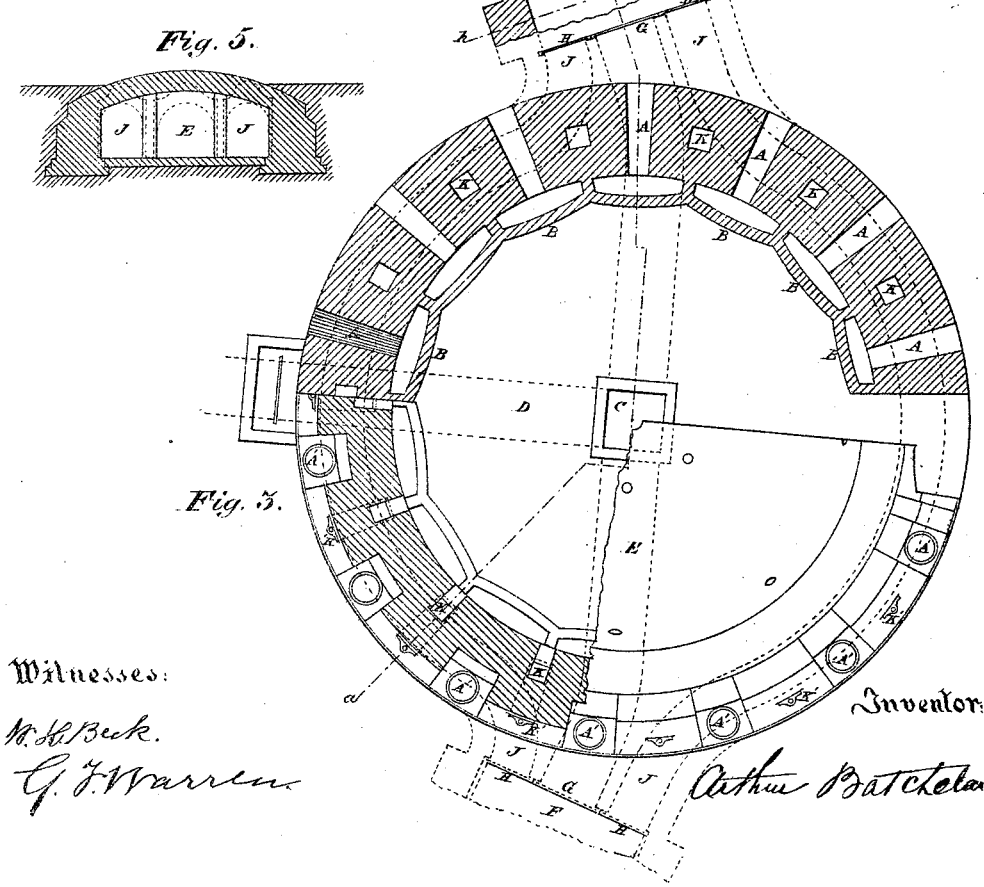
Fig. 3.
Witnesses:
Inventor:

A. BATCHELAR.
Improvement in Kilns.

No. 114,095.   Patented April 25, 1871.

Witnesses:
W. H. Beck.
G. F. Warren.

Inventor:
Arthur Batchelar.

United States Patent Office.

ARTHUR BATCHELAR, OF BROCKHAM, GREAT BRITAIN.

Letters Patent No. 114,095, dated April 25, 1871.

IMPROVEMENT IN KILNS.

The Schedule referred to in these Letters Patent and making part of the same.

I, ARTHUR BATCHELAR, of Brockham, in the county of Surrey and Kingdom of Great Britain, have invented certain "Improvements in Kilns for Burning Bricks, Tiles, Pottery, Lime, Cement, and other similar articles," of which the following is a specification.

My invention consists in constructing a peculiar arrangement of heat-flues in connection with kilns of circular or other form in which fire-places or furnaces are employed.

The said flues are constructed in such manner that the heated air and products of combustion being made to pass, first, upward around the bricks or other ware stacked in the kiln, and then to descend through and among the said bricks, may either be allowed to pass direct into the chimney, (which may be constructed in the center of each kiln or at a distance from it, the passage leading thereto being at or near the bottom of the kiln,) or they may be conveyed by the heat-flues above mentioned into one or more other kilns of similar structure, which, as hereafter explained, may be made to work in conjunction with it.

I arrange a number of these kilns in a series, connecting them together by the heat-flues and, by preference, to one main chimney in such manner that any one or more of the kilns in the series may be burning while others are being filled or emptied.

Some of such kilns may contain green bricks, or other articles, through and among which the waste heated gases and products of combustion are allowed to pass, by means of the heat-flues, from the kiln in active operation before passing to the chimney, so as to dry or prepare the said goods for burning.

Description of the Accompanying Drawings.

Figure 3 is a partial plan and horizontal section, one of the latter being taken on line $c\ d$ through furnaces in fig. 1, and the other on line $e\ f$ in the same figure.

Figure 4 is a sectional plan through what I call the horizontal heat-flues and collecting-chambers.

Figure 5, section at $g\ h$, figs. 3 and 4, through a collecting-chamber.

Figures 6, 7:
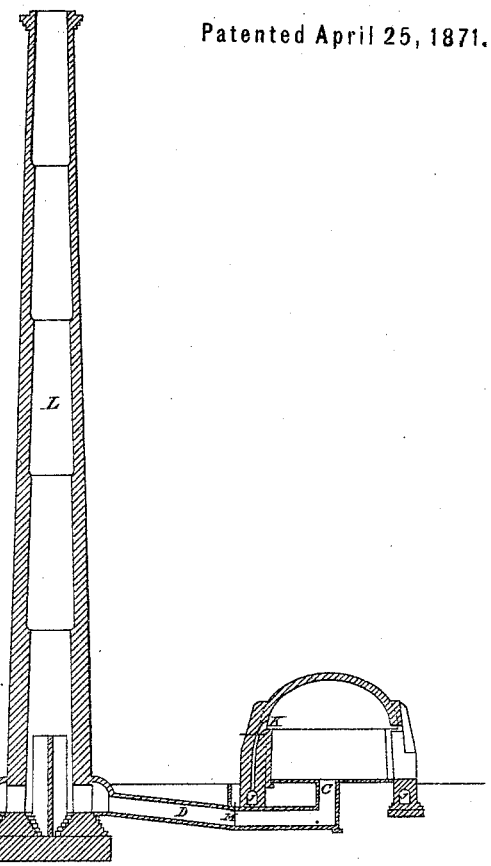

Figures 6 and 7 represent the arrangement of these kilns in a series.

The letters of reference in each of the figs. 1, 2, 3, and 4 refer to like parts in each of those figures.

I prefer to employ a kiln circular in plan and having a domed roof, as shown in the drawings; but kilns of other forms may be constructed with heat-flues in accordance with my invention.

A A A, &c., represent the furnaces constructed in the thickness of the wall, and furnished with fire-bars in the ordinary manner, the fuel being fed through openings A', which are kept closed when the furnace is in operation.

The number of furnaces may be varied, according to the size of kiln and nature of the material to be operated upon.

Inside the kiln and opposite to each furnace are built short walls B B B, &c., forming a casing or pocket round the end of each fire-place, which directs the heat and flame upward toward the upper part of the goods stacked in the kiln.

In the floor of the kiln is formed an opening, C, leading into the main flue D, which conducts the heated products of combustion direct to the chimney, when in the course of burning it is necessary to so dispose of them.

There are also formed beneath the floor of the kiln heat-flues E E, which each open at one end into the passage C, and at the other end into connecting-chambers F F constructed in the space between any two adjacent kilns.

Dampers G G are adapted to close the ends of said flues when required.

J J are also heat-flues constructed in the wall of the kiln near the bottom thereof; or, if preferred, they may be formed wholly outside or wholly inside of the kiln instead of in the wall, as shown.

Figure 1:
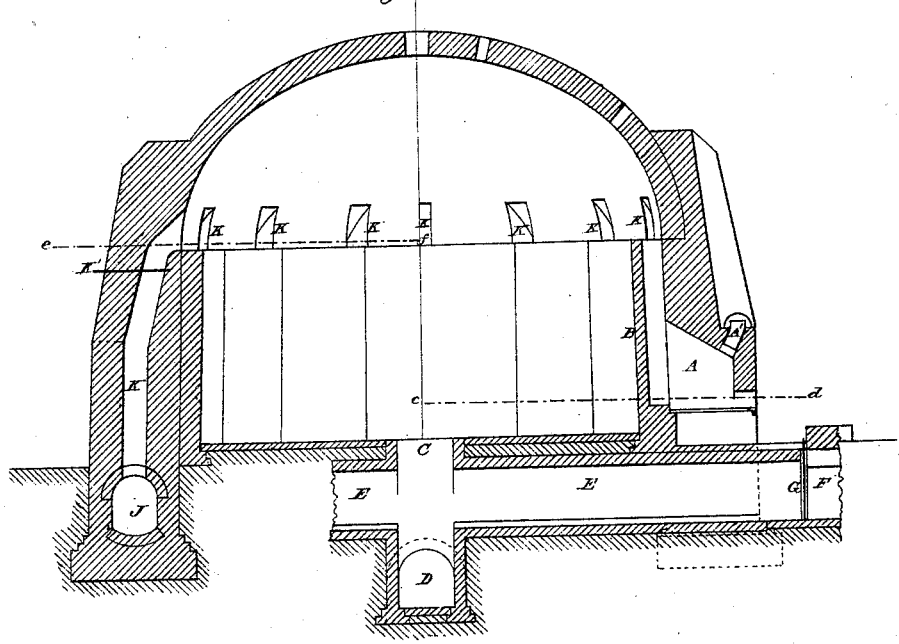
Figure 1 is a vertical section, at line $a\ b$ of fig. 3, of a kiln constructed with the peculiar arrangement of heat-flues.
Figure 2:
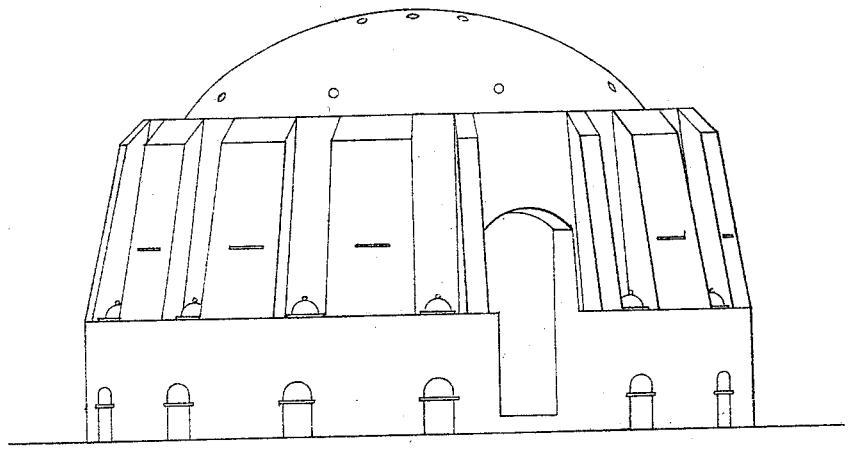
Figure 2 is an elevation of the same.

K K K, &c., are vertical heat-flues, also formed in the wall of the kiln, and provided with dampers K' K' K', &c., their lower ends communicating with the flues J, and their upper ends opening into the kiln, as shown clearly at figs. 1 and 3.

The flues J pass half round each kiln and open at each end into the chamber F by the side of the flues E, the ends of said flues J being also closed by dampers H H when required.

Figs. 6 and 7 represent the arrangement of these kilns in a series for working them in rotation, so as to utilize the waste heat passing from the kiln in active operation to the purpose of drying green or unburned goods stacked in another kiln in order to prepare them for the final burning. Nos. 1 to 8 represent a series of eight of the above-described kilns grouped round a central chimney, L.

Main flues $D^1\ D^2\ D^3$, &c., lead from the center of each kiln to the said chimney-shaft.

Dampers $M^1\ M^2$, &c., are fitted to each main flue to open or close communication between the kilns and chimney, as may be desired.

The method of working these kilns in a series is as follows:

Supposing the fires to be lighted in kiln No. 3, fig.

7, the dampers $H^3 H^3$ at end of heat-flues $J^3$ are kept closed, the damper $M^3$, in the main flue of that kiln leading to the chimney, is opened until the fires are well burned up, when the damper $M^3$ may be partly closed and the dampers $H^4 H^4$, leading from chamber F into heat-flues $J^4 J^4$ of kiln No. 4, (in which green goods are stacked,) are partly opened, the damper $M^4$ in main flue of same kiln being also opened, the damper $G^4$ being meanwhile kept closed and the damper $G^3$ open.

By these means one portion of the heated gases generated in kiln No. 3 passes direct to the chimney, and the other portion by the heat-flue $E^3$ into the connecting-chamber $F^3$; thence into the heat-flues $J^4 J^4$, and so by flues K K K, &c., into kiln No. 4; then through and among the green goods therein, and finally escapes by the main flue $D^4$ of No. 4 kiln into the chimney.

By properly adjusting the dampers in the flues, as indicated, the amount of waste gases passed from the kilns in operation to the next may be so regulated as to insure a proper draught for maintaining the combustion of the fuel at all stages of the operation; and by gradually closing the damper of the kiln in operation leading direct to the chimney, and opening that leading to the next kiln, the whole of the waste gases may be passed through the latter toward the completion of the firing operation of the first kiln, and by that time the goods in the second kiln will have attained a very high temperature.

As soon as kiln No. 3 is burned off the damper $G^3$ leading to kiln No. 4 may be closed, as also partially or wholly the damper $M^3$ in main flue, and the kiln No. 3 left to cool gradually.

Kiln No. 5, the next in order containing green goods, will be gradually brought into communication with kiln No. 4 by means of the dampers when the fires of the latter are lighted, as described for Nos. 3 and 4.

Kiln No. 2, having been burned off previously to No. 3, will have been cooling while the latter was burning, and No. 1, having been previously cooled, the fired goods will have been discharged from it, and green goods recharged into it.

While No. 3 has been burning No. 7 has also been burning, and Nos. 5, 6, and 8 have held the same position in relation to it that Nos. 1, 2, and 4 have been described as holding to No. 3.

The arrangement of the heat-flues E and J and connecting-chambers F admits of the series being worked in either direction, as may be convenient.

It will now be understood that by working a series of these kilns in pairs and in rotation, and passing the waste heated gases through the kilns containing green goods in the manner described, the effect produced on the goods will be more completely under control and therefore more uniform than has hitherto been obtained, while a considerable saving of fuel will result.

Although the drawings show a double series composed of eight kilns, I do not confine myself to that number, as any other number may be employed, a single series of four being very convenient.

I claim as my invention—

The arrangement and combination, in a series of kilns, of the heat-flues E, J, and K with the main flues D, connecting-chambers F, and the dampers G, H, K', and M, substantially in the manner and for the purposes hereinbefore set forth and described.

ARTHUR BATCHELAR.

Witnesses:
W. H. BECK,
G. F. WARREN.